US009393630B2

(12) United States Patent
He

(10) Patent No.: US 9,393,630 B2
(45) Date of Patent: Jul. 19, 2016

(54) ELECTRIC SAW THAT CAN BE USED AS BOTH A MITER SAW AND A TABLE SAW

(71) Applicant: Caibai He, Miramar, FL (US)

(72) Inventor: Caibai He, Miramar, FL (US)

( * ) Notice: Subject to any disclaimer, the term of this patent is extended or adjusted under 35 U.S.C. 154(b) by 157 days.

(21) Appl. No.: 13/929,417

(22) Filed: Jun. 27, 2013

(65) Prior Publication Data

US 2014/0208915 A1 Jul. 31, 2014

(30) Foreign Application Priority Data

Jan. 29, 2013 (CN) ...................... 2013 2 0050663 U

(51) Int. Cl.
*B23D 45/06* (2006.01)
*B27B 5/16* (2006.01)
*B27B 5/24* (2006.01)

(52) U.S. Cl.
CPC .............. *B23D 45/068* (2013.01); *B27B 5/165* (2013.01); *B27B 5/24* (2013.01); *B27B 5/243* (2013.01); *Y10T 83/7697* (2015.04)

(58) Field of Classification Search
CPC ....................................................... B26B 5/165
USPC ................................................. 83/490, 477.2
See application file for complete search history.

(56) References Cited

U.S. PATENT DOCUMENTS

| | | | | |
|---|---|---|---|---|
| 2,719,547 | A * | 10/1955 | Gjerde | 83/471.3 |
| 3,465,793 | A * | 9/1969 | Zuk | 83/477.1 |
| 3,487,963 | A * | 1/1970 | Thornander | 414/387 |
| 3,570,564 | A * | 3/1971 | Bergler | 83/471.3 |
| 3,887,230 | A * | 6/1975 | Groning et al. | 297/232 |
| 4,531,441 | A * | 7/1985 | Bergler | 83/471.3 |
| 4,549,455 | A * | 10/1985 | Perilloux, Jr. | 83/477.2 |
| 4,640,170 | A * | 2/1987 | Bakken | 83/794 |
| 4,683,982 | A * | 8/1987 | Baker | 182/204 |
| 4,827,819 | A * | 5/1989 | O'Banion et al. | 83/471.3 |
| 5,570,641 | A * | 11/1996 | Garuglieri | 108/13 |
| 5,787,779 | A * | 8/1998 | Garuglieri | 83/397 |
| 6,012,503 | A * | 1/2000 | Balder | 156/578 |
| 6,938,865 | B1 * | 9/2005 | Day | 248/229.14 |
| 2006/0005682 | A1 * | 1/2006 | Gehret et al. | 83/471.3 |
| 2006/0005683 | A1 * | 1/2006 | Lambert et al. | 83/477.2 |
| 2006/0201299 | A1 * | 9/2006 | Santa Ana | 83/468.3 |
| 2007/0089584 | A1 * | 4/2007 | Howard | 83/477.2 |
| 2007/0234864 | A1 * | 10/2007 | Bettacchini | 83/471.3 |
| 2008/0066598 | A1 * | 3/2008 | Ouellette | 83/477.2 |
| 2014/0208914 | A1 * | 7/2014 | He | 83/471.3 |

* cited by examiner

*Primary Examiner* — Stephen Choi
*Assistant Examiner* — Fernando Ayala
(74) *Attorney, Agent, or Firm* — Enshan Hong; VLP Law Group LLP

(57) ABSTRACT

A dual functional electric saw comprising a stationary base having a removable cover, an angle adjustable stand having a removable cover, a saw body, and a connection mechanism for fixing the saw body on the stationary base; wherein the angle adjustable stand comprises a chamber being capable of accommodating the saw body and the removable cover of the angle adjustable stand; the angle adjustable stand is surrounded and supported by the stationary base; the saw body comprises a motor and a saw blade; the connection mechanism comprises a saw supporting column which is capable of being positioned and fastened at both ends so that the height of the saw body can be adjusted to meet the requirements of a miter saw and a table saw, respectively.

1 Claim, 9 Drawing Sheets

ELECTRIC SAW THAT CAN BE USED AS BOTH A MITER SAW AND A TABLE SAW

BACKGROUND OF THE INVENTION

1. Field of the Invention

The present invention relates to electric saw, in particular a dual functional electric saw.

2. Description of the Related Art

Two types electric saw are often used during wood processing, furniture manufacture, indoor and outdoor renovation. A miter saw is often used in cutting wood transversely, and a table saw is commonly used for panel cutting. It is quite inconvenient to bring two types of saws to different working locations.

SUMMARY OF THE INVENTION

The objective of the present invention is to provide a dual functional electric cutting tool with one stationary base and one motor that can be used as both a miter saw and a table saw, has a compact structure, and is convenient to handle.

The present invention adopts the following technical solution:

The dual functional electric saw comprises a stationary base having a removable cover, an angle adjustable stand having a removable cover, a saw body installed on the stationary base, and a connection mechanism for fixing the saw body on the stationary base. The angle adjustable stand comprises a chamber being capable of accommodating the saw body for table sawing, and the removable cover of the angle adjustable stand. The angle adjustable stand is surrounded and supported by the stationary base. The saw body comprises a motor and a saw blade. The connection mechanism comprises a first segment having two ends, which are a first end and a second end, and a second segment having two ends, which are a third end and a fourth end. The first segment comprises a first position pin and a first fastening screw at the first end, and is pivotally connected at the first end with the saw body by the first position pin and the first fastening screw. The second segment comprises a second position pin and a second fastening screw at the third end, and is pivotally connected at the third end with the second end of the first segment. The height and direction of the saw blade can be adjusted by adjusting the first and second position pins, first and second fastening screws, and rotating the saw body so that the dual functional electric saw can be switched between a miter saw mode and a table saw mode.

The stationary base is preferably slightly higher than an average table saw to facilitate switching between a mode of table saw and a mode of miter saw as described below in more detail.

The saw body installed on the stationary base can normally be used as a miter saw. When a table saw is needed, one can remove the removable cover of the stationary base and the removable cover of the angle adjustable stand, rotate the saw body so that the blade of the saw is upward, push the saw body into the chamber of the angle adjustable stand, and then put back the removable cover of the stationary stand and the removable cover of the angle adjustable stand.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
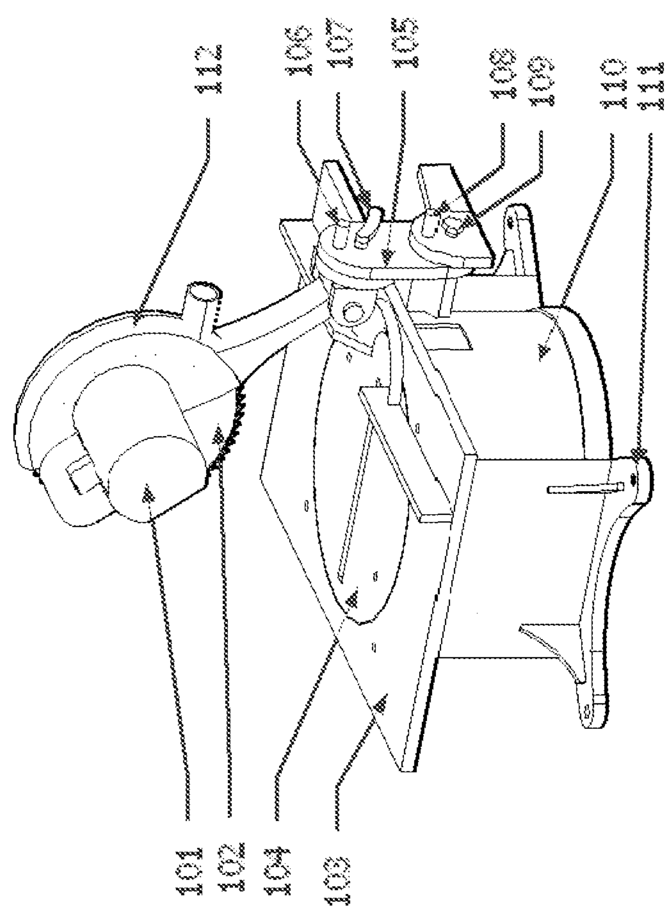
FIG. 1 is a schematic view of the structure of an electric saw in accordance with an embodiment of the present invention when the electric saw is in the form of a miter saw.

A preferred embodiment of the present invention will be described hereinafter with reference to the drawings:

List of reference numbers in the figures is provided below:

101—motor;
102—saw blade;
103—removable cover of the stationary base;
104—removable cover of the angel adjustable base;
105—saw supporting column;
106—positioning pin;
107—fastening screw;
108—positioning pin;
109—fastening screw;
110—angle adjustable base;
111—stationary base;
112—saw body;

As shown in, e.g., FIG. 1, in accordance with one embodiment of the present invention, a saw support column 105, positioning pins 106 and 108, fastening screws 107 and 109 are provided to fix the saw body 112 on the stationary base 111. Pulling the positioning pins 106 and 108, loosening fastening screws 107 and 109, one can raise the height of the saw body 112 to meet the requirement of a miter saw or lower the height of the saw body 112 to meet the requirement of a table saw.

FIG. 1 shows a structure of the electric saw when it can be used as a miter saw in accordance with an embodiment of the present invention.

Figure 2:
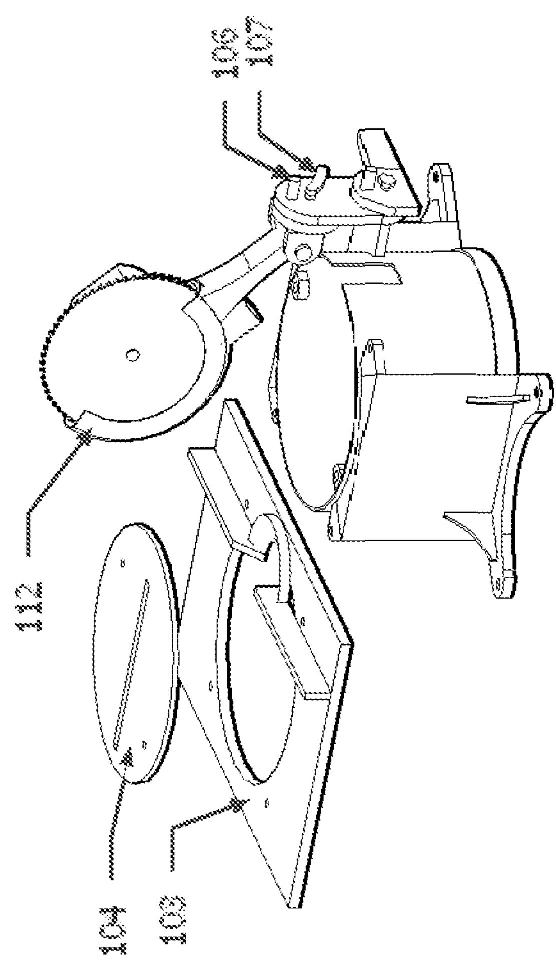
FIG. 2 is a schematic view of the structure of the electric saw shown in FIG. 1 when the removable cover of the stationary base and the removable cover of the angel adjustable cover are both removed, and the saw body is rotated 180° so that the saw blade is upwards.
Figure 3:
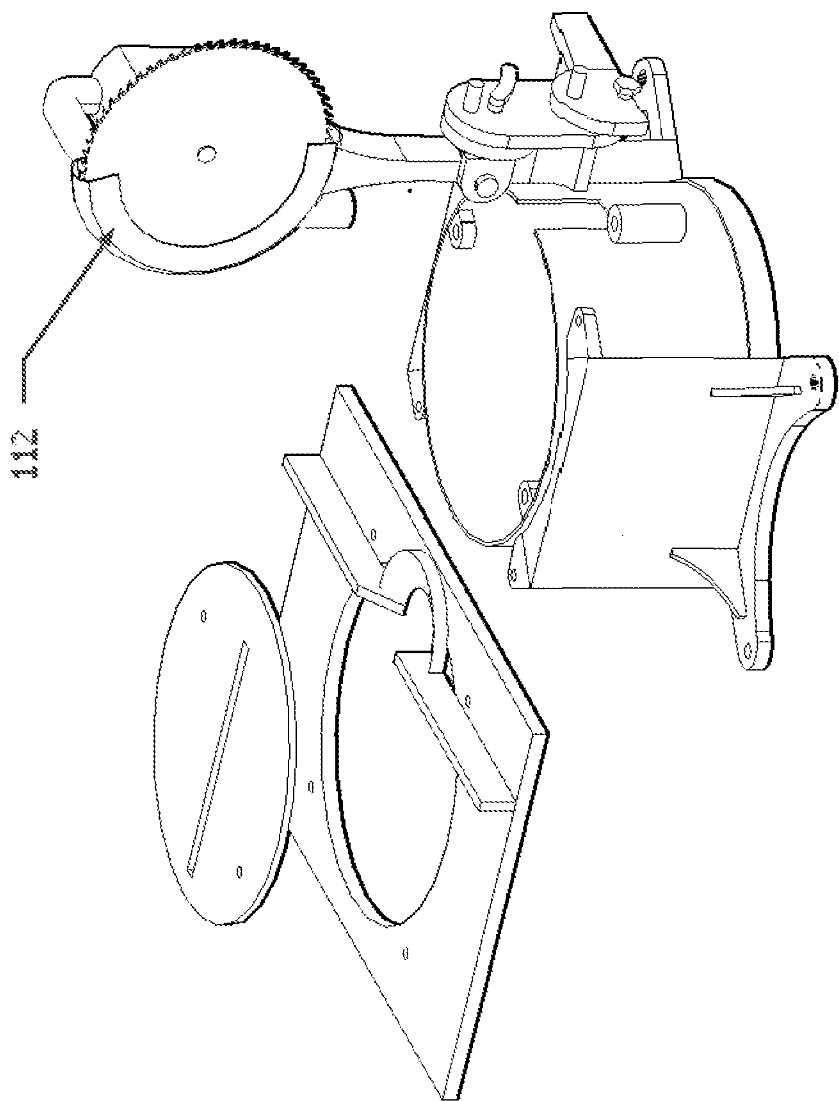
FIG. 3 is a schematic view of the structure of the electric saw shown in FIG. 2 when the saw body is push up straight.
Figure 4:
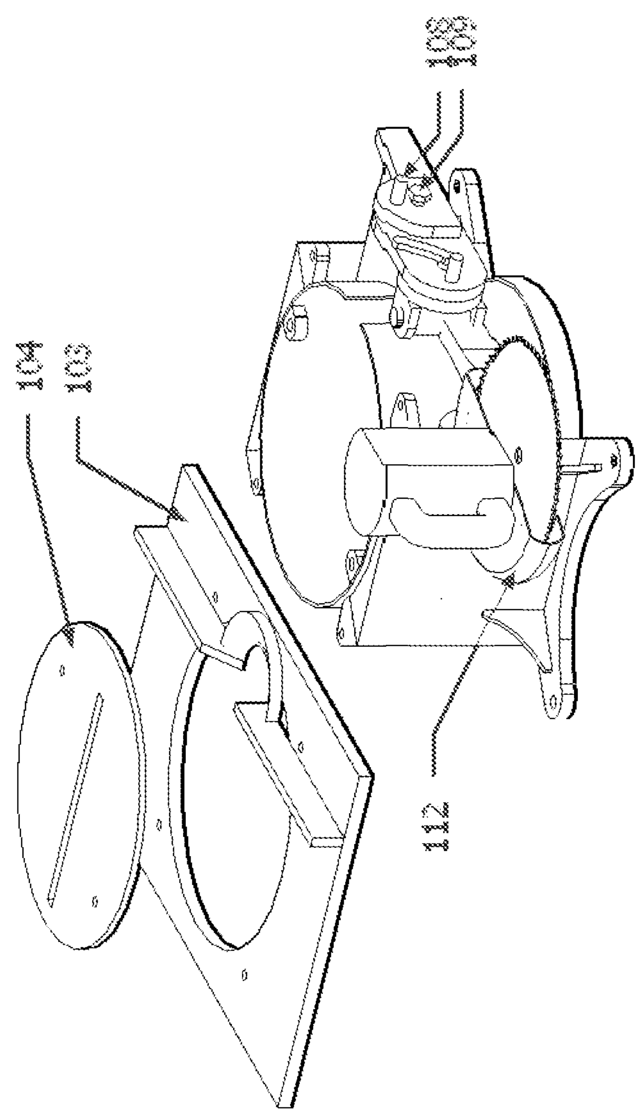
FIG. 4 is a schematic view of the structure of the electric saw shown in FIG. 3 when the saw body and the supporting column are pushed down transversely.
Figure 5:
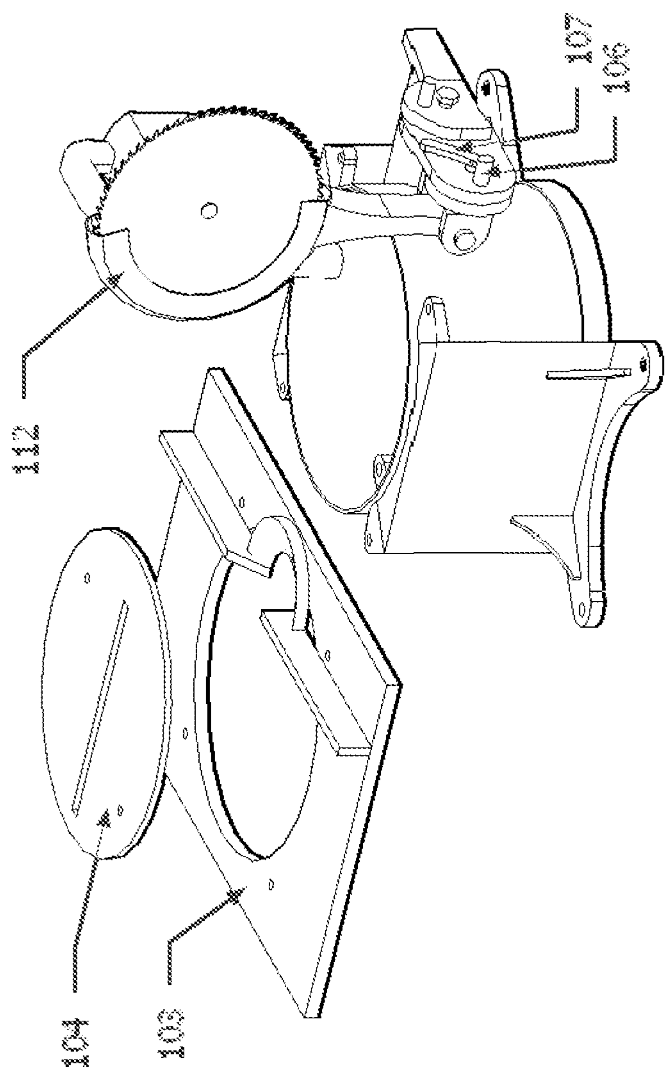
FIG. 5 is a schematic view of the structure of the electric saw shown in FIG. 4 when the saw body is pushed upright.
Figure 6:
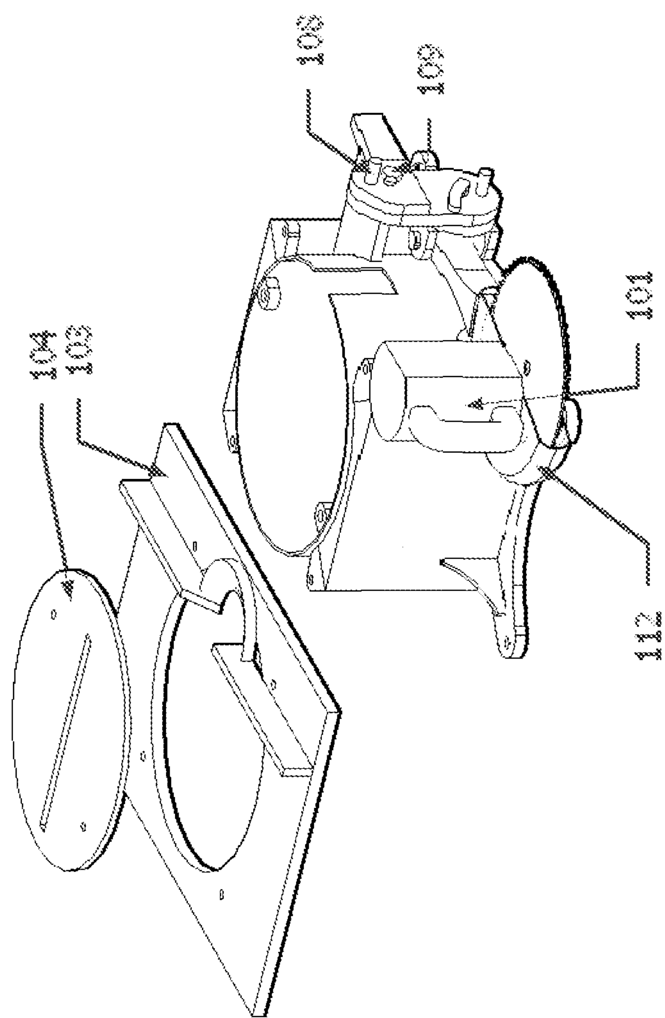
FIG. 6 is a schematic view of the electric saw shown in FIG. 5 when the saw body is pushed down transversely and the supporting column remains upright.
Figure 7:
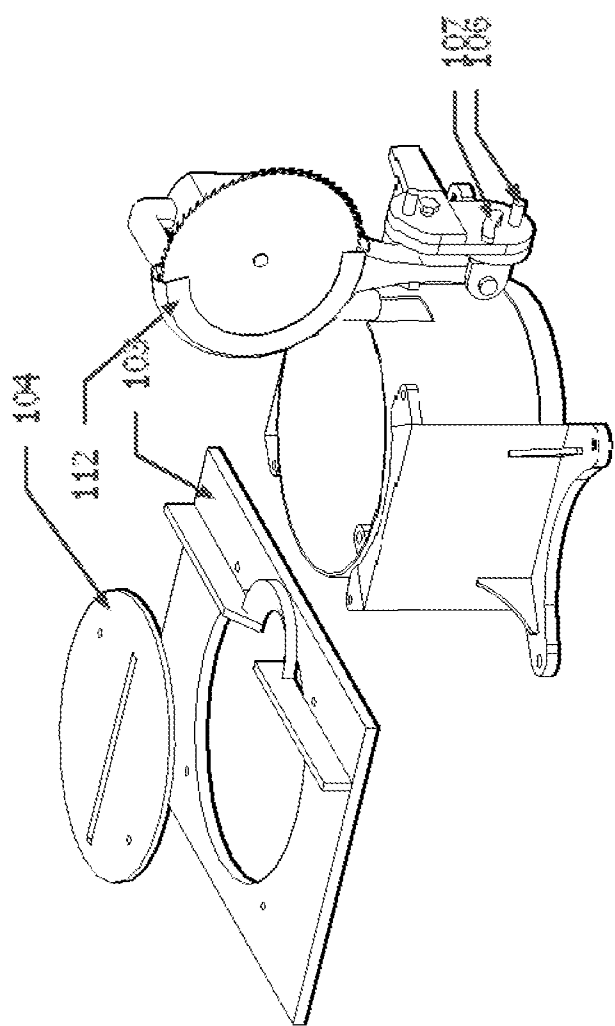
FIG. 7 is a schematic view of the structure of the electric saw shown in FIG. 6 when the saw body is pushed upright.
Figure 8:
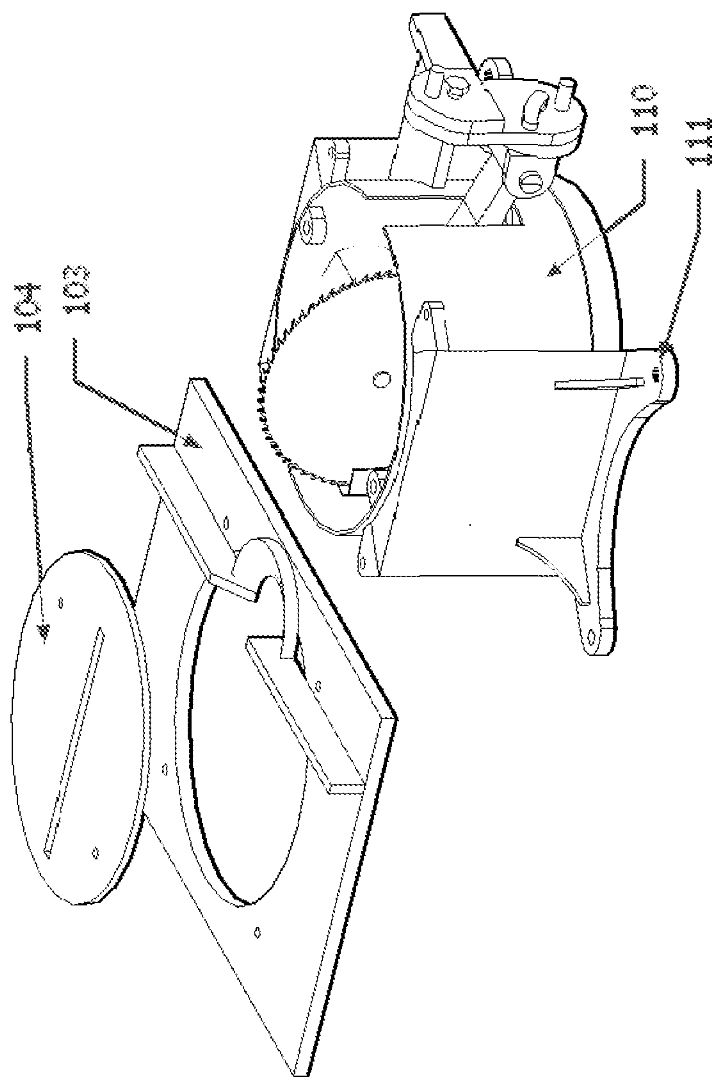
FIG. 8 is a schematic view of the structure of the electric saw shown in FIG. 7 when the saw body is pushed inside the chamber.
Figure 9:
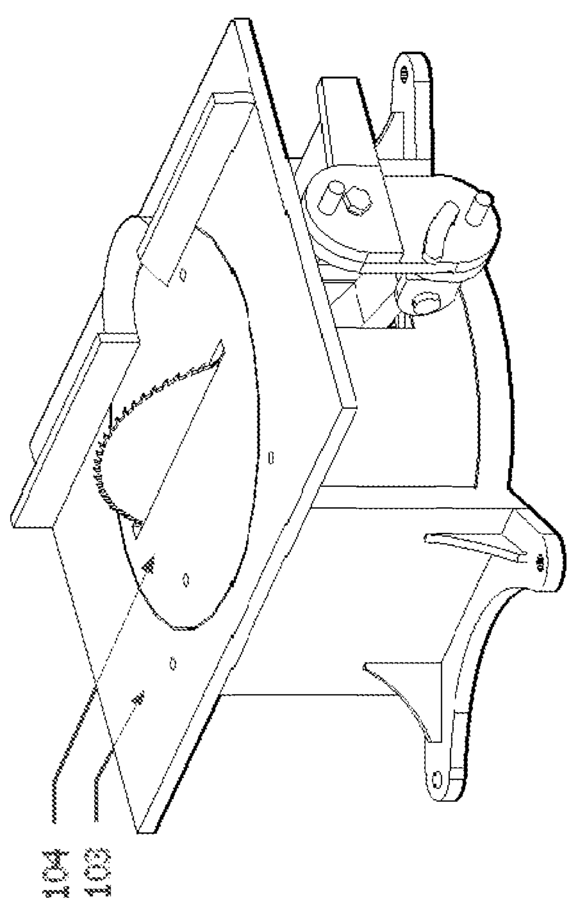
FIG. 9 is a schematic view of the structure of the electric saw shown in FIG. 8 when both the removable cover of the stationary base and the removable cover of the angle adjustable stand are put back so that the electric saw is ready to be used as a table saw.

When the electric saw in accordance with an embodiment of the present invention needs to be used as a table saw, one needs to remove the removable cover 103 of the stationary base 111 and the removable cover 104 of the angle adjustable stand 104, loosen fastening screw 107, pull positioning pin 106, rotate saw body 112 180° so that the saw blade is upwards (see FIG. 2), push the saw body 112 upright (see FIG. 3), loosen fastening screw 109, pull positioning pin 108, push the saw body 112 transversely (see FIG. 4), loosen fastening screw 107, pull positing pin 106, push the saw body 112 upright (see FIG. 5), loosen fastening screw 109, pull positioning pin 108, push saw body 112 transversely (see FIG. 6), loosen fastening screw 107, pull positioning pin 106, push the saw body 112 upright (see FIG. 7), push the saw body 112 into the chamber of angle adjustable stand 110, put back removable covers 103 and 104 (see FIG. 9), then the electric saw can be used as a table saw.

The invention is not limited by the embodiments described above which are presented as examples only but can be modified in various ways within the scope of protection defined by the appended patent claims.

What is claimed is:

1. A dual functional electric saw comprising a stationary base having a removable cover, an angle adjustable stand having a removable cover, a saw body, and a connection mechanism for fixing the saw body on the stationary base; wherein the angle adjustable stand comprises a chamber being capable of accommodating the saw body for table sawing; the angle adjustable stand is surrounded and supported by the stationary base; the saw body comprises a motor and a saw blade; the connection mechanism comprises a first segment having two ends, which are a first end and a second end, a second segment having two ends, which are a third end and a fourth end, and is pivotally connected at the first position pin and a first fastening screw at the first end, and is pivotally connected at the first end with the saw body by the first position pin and the first fastening screw, the second segment comprises a second position pin and a second fastening screw at the third end, and is pivotally connected at the third end with the second end of the first segment, whereby the height and direction of the saw blade can be adjusted by adjusting the first and second position pins, first and second fastening screws, and rotating the saw body so that the dual functional electric saw can be switched between a miter saw mode and a table saw mode, the saw body is pivotal relative to the first segment, and the first segment together with the saw body are pivotal relative to the second segment.

* * * * *